United States Patent [19]
Bobbitt

[11] 3,746,445
[45] July 17, 1973

[54] MATRIX LAYOUT BOARD FOR MAKING MULTI-CHARACTER FILM CHIPS

[76] Inventor: Barton D. Bobbitt, 2770 Daniel, San Diego, Calif. 92111

[22] Filed: Mar. 20, 1972

[21] Appl. No.: 236,010

[52] U.S. Cl. .................. 355/40, 95/4.5 R, 95/85, 355/75
[51] Int. Cl. .......................................... G03b 27/52
[58] Field of Search .................. 95/85, 4.5; 355/40, 355/75

[56] References Cited
UNITED STATES PATENTS

| | | | |
|---|---|---|---|
| 3,204,520 | 9/1965 | Grube | 95/4.5 R X |
| 3,395,632 | 8/1968 | Pook | 95/85 |
| 2,972,938 | 2/1961 | Sausele | 95/85 |
| 3,504,613 | 4/1970 | Wagner et al. | 95/85 |

Primary Examiner—Samuel S. Matthews
Assistant Examiner—Richard A. Wintercorn
Attorney—R. S. Sciascia, G. J. Rubens et al.

[57] ABSTRACT

A matrix layout board is made as a scalar enlargement of the film chip to be fabricated and has a plurality of identical size sections equal in number to the number of characters on the film chip. A plurality of interchangeable section plates bearing alpha numeric and symbolic characters are configured to fit in any selected section of the board. Means for retaining a selected combination of the section plates on the board are provided and a camera is positioned to form an image of the board at an image plane on the film of the camera providing a size reduction ratio for producing the image in a size equal to the desired size of the film chips to be fabricated. The film is exposed in successive portions according to the number of identical film chips desired having the particular combination of selected alpha-numeric and symbolic characters positioned on the layout board. The film is then processed and cut to the desired size and outside configuration of the final film chips.

6 Claims, 4 Drawing Figures

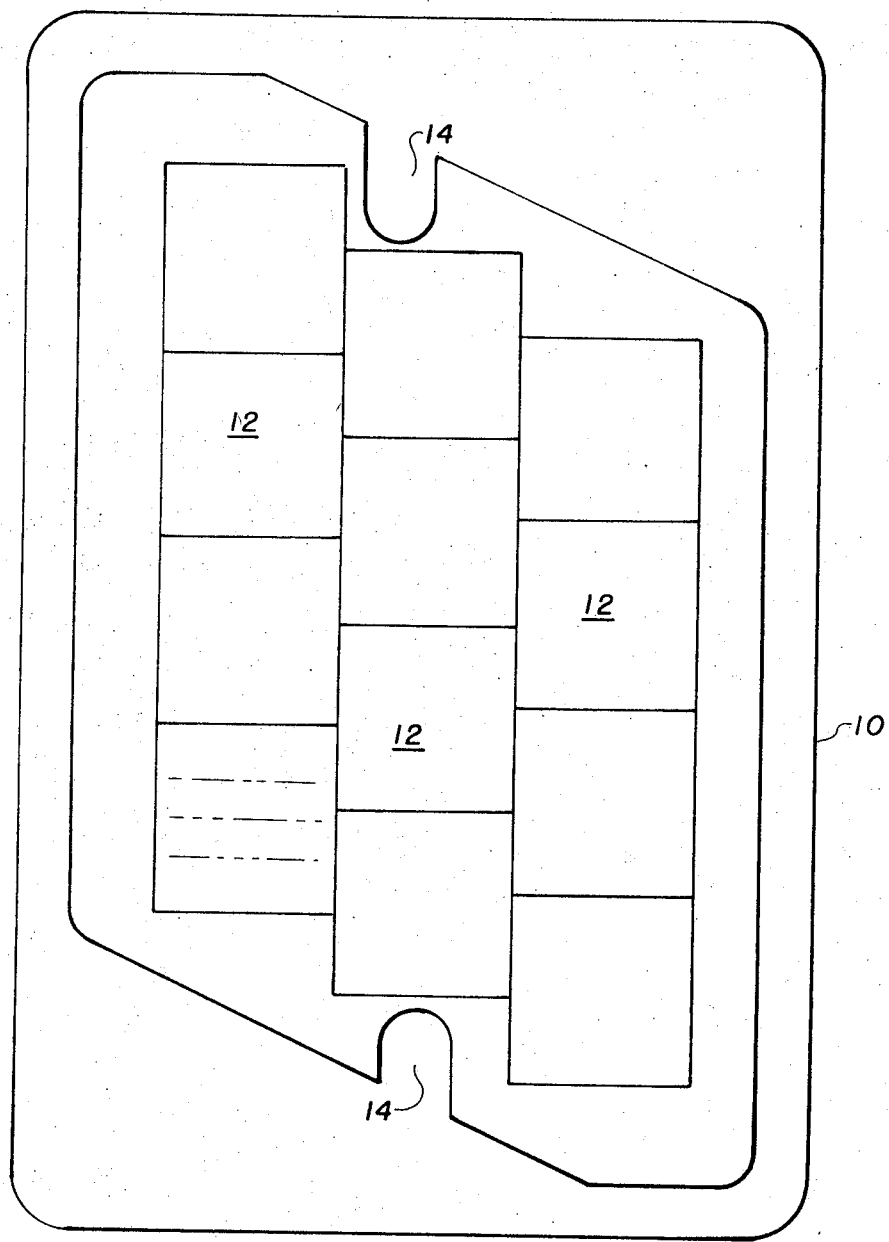
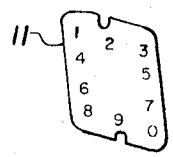
FIG. 1
FIG. 3a
FIG 3b
FIG. 2

MATRIX LAYOUT BOARD FOR MAKING MULTI-CHARACTER FILM CHIPS

BACKGROUND OF THE INVENTION

In present day consoles, particularly of the electronic, data processing, and computer type, it is frequently desirable to visually present many different types of data and information in a great number of possible variations. Accordingly, such consoles may include what are known in the art as multi-character, rear projection, readout displays.

Such units are commercially available and customarily the projected visual information is displayed on a translucent faceplate. A film chip having a plurality of characters disposed thereon is arranged in combination with suitable optical elements for the projection of a selected character by the illumination of a small light source positioned behind each character on the film chip.

The size of such projection readout elements is relatively small in order to conserve space for the convenient presentation of many items of information, data, etc. visually to an operator at a console. A typical size for a twelve character unit has a face plate of only approximately 2 ½ inches × 1 ½ inches. The film chip upon which the characters are disposed therefore may have twelve such characters in a space considerably smaller than 2 ½ inches × 1 ½ inches. Necessarily, the disposition of each character upon the film chip must be in correct optical alignment for individual independent projection on the face plate of the unit. Any lack of precision in the position of the characters on the film chip will result in a compounding of the error due to the multiplication factor resulting from the relatively very small size of each character on the film chip as contrasted to its greatly enlarged size when projected on the face plate of the readout projection unit. Accordingly, it is required that such film chips be of a high order of precision both with respect to the visual sharpness of the individual characters and also relative to their disposition on the film chip and alignment with the optical elements of the unit.

One prior art procedure for fabricating the film chips was to first establish the specific size of the film chip and the format of the data and characters on the film. Then several chip formats were hand drawn on an art board, for example, usually measuring several feet square. The chip formats, as hand drawn in black and white on the art board were then photocopies onto black and white film, the image size on the film being the exact size of the desired end product of the film chip after the film was suitably processed.

The art board layouts on 8 inches × 10 inches sheet of black and white copy film then had colored transparent material affixed over each chip or series of chips in accordance with the decision on the color coding of each data unit of each chip format.

The sheet of chip matrices with the affixed color transparent material were then processed in a color photo-copy laboratory and printed on 8 inches × 10 inches sheets of color reversal film. After the film was processed, the film chips were cut into smaller sizes, usually in a group of three chip images so that they could be properly positioned in a three station dye punch, for example, which cut each chip into its final size and desired configuration.

This type of prior art procedure for fabricating film chips, had the disadvantages of requiring a multitude of individual steps which involved a great deal of individual hand labor contributing disadvantageously to both the cost and the length of time required to complete the process. For example, the initial cost of 72 individual film chips for one Navy Tactical Data System console was approximately $15.00 per chip or $1,080 to make a set of film chips for a single console. When several sets of identical film chips are required for a multi-console installation the cost may be reduced to about $3.00 for each chip depending on the number of identical sets of chips needed. Nonetheless, experience has indicated that the average cost per film chip is approximately $10.00.

The relatively high cost of prior art procedures is incurred not only because of the many hours of hand art work required, but also because two separate and distinct photocopy and film processing steps were necessary, one for the black and white film, and the other for the color film. Moreover, the length of time from the beginning of the procedure involving the art board work to the final completion of the film chips usually encompassed several weeks and sometimes as much as several months.

Additionally, precise quality control of the color was most difficult because of the various hues that are used in transparent color coding material and variations or lack of consistency of color in such material, together with inherent problems of color film processing techniques.

Accordingly, there is a need for a system of fabricating film chips, such as are used in optically projected readout units, which will produce a satisfactorily precise film chip at much less cost and in a much shorter period of time required to complete the procedure.

SUMMARY OF THE INVENTION

The concept of the present invention contemplates the fabrication of a film chip matrix layout board which has the exact configuration of the desired end product film chip and also is an exact scale enlargement of the film chip. The board is divided into a plurality of identical size sections equal in number to at least the number of characters to be included on the film chip.

A plurality of interchangeable section plates configured to fit the sections of the matrix layout board are fabricated with the desired alpha-numeric and symbolic characters to be included on the finished film chips. Suitable means for maintaining any selected combination of of the section plates within particular sections of the matrix layout board is provided such as adhesive on the back of the section plate, for instance. Magnetic means may also be used advantageously to position and retain the selected section plates in sections of the matrix layout board as desired.

A camera is then positioned with its film plane at the image plane of the matrix layout board for providing a size reduction ratio producing an image of the matrix layout board equal to precisely the desired size of the film chips to be fabricated. The camera then exposes successive portions of photographic film, preferably of the color reversal type, to the reduced size image of the matrix layout board. The number of exposures of any particular arrangement of the matrix layout board is determined by the number of film chips desired bearing that particular disposition and combination of alphanumeric and symbolic characters, including selected color coding and combinations. The film is then processed and finally cut to the desired size and exact peripheral configuration of the final film chips.

In a preferred embodiment of the present invention the interchangeable section plates bearing alphanumeric and symbolic characters, are not only color coded, but may have a suitable edge configuration for interlocking with the matrix layout board sections and adjacent sections plates as well, for assuring uniformity of placement and retention in the matrix layout board.

Moreover, if desired in a preferred embodiment of the present invention the sections of the matrix layout board which are adapted to receive interchangeable section plates bearing alpha-numeric and symbolic characters may also have suitable indicia such as guide lines for facilitating correct alignment of the characters on the interchangeable section plates.

The advantages of the concept of the present invention will be apparent to those skilled in the art and familiar with the problems and difficulties of fabricating multi-character film chips. Only one simple film processing step is required in accordance with the concept of the present invention and the relatively lengthy and expensive process of photo-copying black and white film and the use of an overlay of color transparent material are entirely eliminated. Furthermore, the simplicity of the present invention is such that it is adaptable for use with a relatively inexpensive camera such as a 35mm camera, for example, and the interchangeability of section plates bearing any variety of desired alphanumeric and symbolic characters eliminates the need for a hand-drawn art work as was required in the prior art practice.

Accordingly, it is a primary object of the present invention to provide a procedure and means for making multi-character film chips at a significantly reduced cost.

It is a concomitant object of the present invention to provide such a procedure and means for making multi-character film chips in a significantly reduced period of time as compared to that customarily required in comparable prior art practices.

Another most important object of the present invention is to provide a procedure and means for fabricating film chips with a significantly improved uniformity, consistency, and reliability of color coding.

A further object of the present invention is to provide a means and procedure for fabricating film chips which affords an improved degree of flexibility in the selection and disposition of alpha-numeric and symbolic characters within the format of the film chip.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

In the drawings:

FIG. 1 is a plan view of an embodiment of the film chip matrix layout board of the present invention;

FIG. 2 is an illustration of the actual size of the finished film chip fabricated in accordance with the concept and teaching of the present invention;

FIG. 3a is a plan view of a typical section plate of the present invention; and

FIG. 3b is a cross-sectional view of the section plate of FIG. 3a.

DESCRIPTION OF THE PREFERRED EMBODIMENT

As shown in FIG. 1, the concept of the present invention contemplates the use of a film chip matrix layout board 10 which is a scalar enlargement of the actual size film chip 11 as shown in FIG. 2. The portion of the film chip matrix layout board 10 which is to bear alphanumeric and symbolic information is divided into a plurality of identical size sections 12 which are at least equal in number to the number of the characters to be included on the film chip to be fabricated and are disposed in the same format as is desired on the finished film chip. This will be evident from a comparison of the placement of the plurality of identical sections 12 with the disposition of the numerical characters on the actual chip 11 as shown in FIG. 2.

A plurality of interchangeable section plates configured to fit sections 12 of the film chip matrix layout board are provided and may take the form generally as illustrated by the specimen section plate 13, shown in FIG. 3a. Each section plate bears an alpha-numeric or symbolic character of the type generally represented by the "9" illustrated in FIG. 3a. Such alpha-numeric symbols may be color coded with a black surrounding area of the section plate or the alpha-numeric symbol may be black with a color coding of the surrounding area.

Such section plates are made in a quantity and variety of alpha-numerics and symbols as desired to facilitate their interchangeable use in making up any desired combination and arrangement on the identically sized sections 12 of the film chip matrix layout board 10. Each such section may have a suitable adhesive to assure its retention in a selected section 12 for providing a desired combination of section plates as required by the configuration and arrangement of the alphanumerics and symbol characters desired on the finished film chip. Additionally, as shown in FIG. 3b, the section plates may have approprite interlocking edges for further assuring the proper alignment and disposition of each section plate relative to its adjacent section plates.

OPERATION

The present invention contemplates the fabrication of a film chip matrix layout board including the requirements of the finished end product film chip desired, such as peripheral configuration with in height dimensions etc. The film chip matrix layout board may also include locational indents 14 which facilitate the final cutting of the finished film chip and its subsequent proper location in the rear lighted projection readout unit for which it is designed.

As previously mentioned, the film chip matrix layout board may be finished in black or any other suitable color as chosen in accordance with the requisites of selected color coding. Section plates, such as that illustrated in FIG. 3a, are then chosen in number and bearing the alpha-numeric and symbolic characters desired to be provided in the finished film chip and are positioned at the desired respective locations within the plurality of sections 12 provided by the film chip matrix layout board.

In a preferred embodiment of the present invention, an appropriate magnetic means may be provided for assuring the proper positional retention of the plurality of section plates on the film chip matrix layout board. The camera is then positioned so that its film plane is at the image plane of the film chip matrix layout board 10, providing a size reduction ratio relative to the scalar enlargement as represented in the film chip matrix layout board so that an image is produced of the matrix layout board equal to the desired size of the film chips to be fabricated. Such actual size is illustrated in the example 11 of FIG. 2.

Film in the camera is then exposed in successive portions to the image produced within the camera, such portions being equal in number to the number of desired identical film chips having the particular format and combination of characters of the selected section plates placed in the sections 12 of the matrix layout board 10. The photographic film, which is preferably of the color reversal type, is then processed and cut to the desired final size and peripheral configuration including the locational indents 14. The end product, therefore, is a film chip which may generally be the type illustrated in FIG. 2 at 11 and including the desired arrangement and combination disposition and color coding of selected alpha-numeric and symbolic characters. Film chip 11 as illustrated in FIG. 2 used in a suitable rear-lighted projection readout unit, will upon the actuation of individual lamps behind each of its sections, visually present an enlarged projection at the face plate of the readout unit of that particular alpha-numeric character or symbolic character which is actuated.

Those skilled and knowledgeable in the art will appreciate that the concept of the present invention affords great flexibility in its use and employment, as well as significantly reducing both the cost and the time required to produce suitable film chips for use in visual readout units as previously described herein.

Moreover, because the concepts and teachings of the present invention eliminate the use of color transparent material, any lack of consistency or quality control of such color transparent material in different lots or from different manufacturers can be avoided completely. Accordingly, by the choice of high quality color reversal film from a single manufacturer, excellent quality control and reliability of consistency in color can be readily achieved. These advantages, together with the significant savings which represent at least a ten-fold improvement over the cost of prior practices, render the teaching of the present invention a highly desirable and fully practical concept in all respects.

It will be appreciated, of course, by those skilled and knowledgeable in the art of fabricating film chips that the concept of the present invention includes any configuration or number of alpha-numeric or symbolic characters which, for example, in present day readout units commercially available may be as many as 48 in number and offer a broad choice of operative characteristics.

Obviously many modifications and variations of the present invention are possible in the light of the above teachings. It is therefore to be understood that within the scope of the appended claims the invention may be practiced otherwise than as specifically described.

What is claimed is:

1. A system for fabricating film chips used in rear-lighted, projected visual readouts of alphanumeric and symbolic characters comprising:
   a matrix layout board dimensioned as a scalar enlargement of the film chip to be fabricated,
   said board having a plurality of identical size sections equal in number to the number of characters included on the film chip to be fabricated and disposed in the same format as on said film chip;
   a plurality of interchangeable section plates configured to fit said sections and having thereon alphanumeric and symbolic characters, and
   means for retaining a selected combination of section plates within said sections;
   said matrix layout board being positionable at the focal plane of a camera to affect a size reduction ratio for producing an image of said board on color reversal film of said camera equal to the desired size of the film chips to be fabricated, and adapted to being cut to the desired size of peripheral configurations of the final film chips after the film has been processed.

2. A system as claimed in claim 1 wherein said plurality of interchangeable section plates include characters and backgrounds in color combinations.

3. A system as claimed in claim 1 and including means for adjustably illuminating said matrix layout board.

4. A system as claimed in claim 1 wherein said interchangeable section plates are retained on said matrix layout board by magnetic means.

5. A system as claimed in claim 1 wherein said interchangeable section plates have interlocking edges.

6. A system as claimed in claim 1 wherein said sections have layout indicia for facilitating the correct alignment of the characters on said interchangeable section plates.

* * * * *